US012688269B2

(12) United States Patent
Cali et al.

(10) Patent No.: US 12,688,269 B2
(45) Date of Patent: Jul. 21, 2026

(54) CONTROLLING AN AEROSOL-GENERATING DEVICE USING BIOMETRIC INFORMATION

(71) Applicant: PHILIP MORRIS PRODUCTS S.A., Neuchatel (CH)

(72) Inventors: Ricardo Cali, Mannheim (DE); Alexandra Sereda, Neuchatel (CH)

(73) Assignee: PHILIP MORRIS PRODUCTS S.A., Neuchatel (CH)

( * ) Notice: Subject to any disclaimer, the term of this patent is extended or adjusted under 35 U.S.C. 154(b) by 498 days.

(21) Appl. No.: 18/250,021

(22) PCT Filed: Oct. 25, 2021

(86) PCT No.: PCT/EP2021/079564
§ 371 (c)(1),
(2) Date: Apr. 21, 2023

(87) PCT Pub. No.: WO2022/090167
PCT Pub. Date: May 5, 2022

(65) Prior Publication Data
US 2023/0385392 A1 Nov. 30, 2023

(30) Foreign Application Priority Data
Oct. 26, 2020 (EP) .................................... 20203940

(51) Int. Cl.
*G06F 21/32* (2013.01)
(52) U.S. Cl.
CPC .................................... *G06F 21/32* (2013.01)
(58) Field of Classification Search
CPC .................................................... G06F 21/32
(Continued)

(56) References Cited

U.S. PATENT DOCUMENTS 9,743,691 B2 * 8/2017 Minskoff .......... A61M 15/0025
9,999,250 B2 * 6/2018 Minskoff ................ H05B 3/12
(Continued)

FOREIGN PATENT DOCUMENTS

CN 110837631 A 2/2020
EP 3 629 906 A1 4/2020
(Continued)

OTHER PUBLICATIONS

Combined Russian Office Action and Search Report issued Feb. 24, 2025, in corresponding Russian Patent Application No. 2023113509/14(028687) (with English Translation and English Translation of Category of Cited Documents), 18 pages.
(Continued)

*Primary Examiner* — Gene O Crawford
(74) *Attorney, Agent, or Firm* — Oblon, McClelland, Maier & Neustadt, L.L.P.

(57) ABSTRACT

A system associated with an aerosol-generating device is provided, the system including: one or more biosensors configured to obtain biometric information of a user having an age; and one or more controllers configured to: analyze the biometric information obtained by the one or more biosensors to determine whether the age of the user is above or below an age threshold, and generate a control signal for controlling operation of the aerosol-generating device based on whether the age of the user is determined to be above or below the age threshold. A method for controlling operation of the aerosol-generating device is also provided.

15 Claims, 4 Drawing Sheets

(58) Field of Classification Search
 USPC .......................................................... 700/237
 See application file for complete search history.

(56) References Cited

U.S. PATENT DOCUMENTS

| | | | |
|---|---|---|---|
| 10,202,272 B2 | 2/2019 | Murison | |
| 10,314,343 B2 | 6/2019 | Newcomb et al. | |
| 10,581,842 B2 | 3/2020 | Zavesky et al. | |
| 10,588,357 B2 | 3/2020 | Hawes et al. | |
| 2020/0000143 A1 | 1/2020 | Anderson et al. | |
| 2020/0128877 A1 | 4/2020 | Sur et al. | |
| 2022/0264956 A1* | 8/2022 | Kim ........................ A24F 40/53 | |
| 2022/0287378 A1* | 9/2022 | Kim ........................ G06V 40/18 | |

FOREIGN PATENT DOCUMENTS

| | | |
|---|---|---|
| JP | 2020-505063 A | 2/2020 |
| RU | 2018 118 600 A | 11/2018 |
| WO | WO 2018/215939 A1 | 11/2018 |
| WO | WO 2019/175810 A1 | 9/2019 |

OTHER PUBLICATIONS

Extended European Search Report issued Mar. 24, 2021 in European Patent Application No. 20203940.0, 11 pages.
International Search Report issued Jan. 20, 2022 in PCT/EP2021/079564 filed Oct. 25, 2021, 4 pages.
International Preliminary Report on Patentability and Written Opinion issued May 2, 2023 in PCT/EP2021/079564, 10 pages.
V. D. A. Corino, et al., "Analysis of Heart Rate Variability to Predict Patient Age in a Healthy Population," Methods Inf. Med., vol. 46, Retrieved from the Internet [URL: http://chrome.ws.dei.polimi.it/images/c/c7/Corino_2007_MIM.pdf], XP055785653, 2007, pp. 191-195.
Russian Decision to Grant issued Jul. 10, 2025, in Russian Patent Application No. 2023113509 (with English translation), 17 pages.
Japanese Office Action issued on Oct. 28, 2025 in Japanese Patent Application No. 2023-525036, 5 pages.

* cited by examiner

300

CONTROLLING AN AEROSOL-GENERATING DEVICE USING BIOMETRIC INFORMATION

The present disclosure relates to a system and method for controlling an aerosol-generating device. Specifically, the present disclosure relates to using biometric information to authenticate a user of an aerosol-generating device.

Aerosol-generating devices may comprise biosensors for identifying a user or modifying aerosol delivery. For example, application number WO 2019/175810 A1 describes aerosol-generating systems having at least one biosensor that may be used to modify aerosol delivery. Application number US 2020/0128877 A1 describes an aerosol delivery device that includes a heart rate monitor. A microprocessor is configured to control operation of at least one functional element of the aerosol delivery device based on an electrocardiogram signal or a heart rate of the user. The electrocardiogram signal forms an identifier of the user, and the microprocessor is further configured to perform a biometric authentication of the user based on the identifier.

It would be desirable to improve safety and security of an aerosol-generating device by preventing operation of the aerosol-generating device by users who are not old enough to be permitted to use the aerosol-generating device. Further, it would be desirable to provide an efficient means for transparently authenticating a user of an aerosol-generating device.

According to an aspect of the present invention, there is provided a system associated with an aerosol-generating device. The system may comprise one or more biosensors configured to obtain biometric information of a user having an age, and the system may comprise one or more controllers. The one or more controllers may be configured to: analyze the biometric information obtained by the one or more biosensors to determine whether the age of the user is above or below an age threshold and generate a control signal for controlling operation of the aerosol-generating device based on whether the age of the user is determined to be above or below the age threshold.

By analyzing the biometric information obtained by the one or more biosensors to determine whether the age of the user is above or below an age threshold and generating a control signal for controlling operation of the aerosol-generating device based on whether the age of the user is determined to be above or below the age threshold, a simple and efficient means for improving safety and security of the aerosol-generating device is provided. Specifically, there is no requirement for expensive dedicated hardware or a separate device that a user interacts with to confirm that the user is old enough to be permitted to operate the aerosol-generating device.

Analyzing the biometric information obtained by the one or more biosensors to determine whether the age of the user is above or below the age threshold may comprise comparing the biometric information obtained by the one or more biosensors to one or more sets of reference biometric information.

Comparing the biometric information obtained by the one or more biosensors to the one or more sets of reference biometric information may comprise comparing heart rate signal patterns. Preferably, this may involve comparing one or more heart rate signal patterns obtained by the one or more biosensors to one or more sets of reference heart rate signal patterns.

Analyzing the biometric information to determine whether the age of the user is above or below the age threshold may comprise determining whether a heart rate value obtained from the one or more biosensors is within a predetermined range of values. The predetermined range of values may depend on motion information obtained from the one or more biosensors.

The system may further comprise a trained classifier (e.g. a neural network) trained to classify the biometric information obtained from the one or more biosensors according to age. Analyzing the biometric information obtained by the one or more biosensors to determine whether the age of the user is above or below the age threshold may comprise inputting the biometric information obtained by the one or more biosensors into the trained classifier, such as a trained neural network.

The one or more controllers may be further configured to analyze the biometric information obtained by the one or more biosensors to identify the user. Analyzing the biometric information obtained by the one or more biosensors to identify the user may comprise comparing the biometric information obtained by the one or more biosensors to one or more sets of reference biometric information. Comparing the biometric information may comprise comparing heart rate signal patterns. Preferably, this may involve comparing one or more heart rate signal patterns obtained by the one or more biosensors to one or more sets of reference heart rate signal patterns.

The system may further comprise a trained classifier (e.g. a neural network) trained to classify the biometric information obtained from the one or more biosensors according user identity. Analyzing the biometric information obtained by the one or more biosensors to identify the user may comprise inputting the biometric information obtained by the one or more biosensors into the trained classifier, such as the trained neural network. The one or more controllers may be further configured to generate a control signal for locking the aerosol-generating device when the user is not identified as a user of the aerosol-generating device.

The one or more controllers may be further configured to, in response to detecting a user input, generate a control signal for starting a configuration mode of the aerosol-generating device. The configuration mode of the aerosol-generating device may be a pre-heating mode of the aerosol-generating device. The one or more controllers may be configured to analyze the biometric information during the configuration mode. The one or more controllers may be configured to generate the control signal for controlling operation of the aerosol-generating device before the end of the configuration mode. The one or more controllers are configured to generate a control signal for locking the aerosol-generating device if no biometric information is obtained from the one or more biosensors before the end of the configuration mode.

Analyzing the biometric information during the configuration mode is more efficient because a user who is allowed to use the device (for example, a user above the age threshold) will not notice any interruption in the operation of the device.

Generating a control signal for controlling operation of the aerosol-generating device may comprise generating a control signal for locking the aerosol-generating device.

Generating a control signal for controlling operation of the aerosol-generating device may comprise generating a control signal for unlocking the aerosol-generating device.

Generating a control signal for controlling operation of the aerosol-generating device may comprise generating a control signal for switching off the aerosol-generating device.

Generating a control signal for controlling operation of the aerosol-generating device may comprise generating a control signal for ceasing operation of the aerosol-generating device.

Generating a control signal for controlling operation of the aerosol-generating device may comprise generating a control signal for allowing the aerosol-generating device to generate an aerosol.

Generating a control signal for controlling operation of the aerosol-generating device may comprise generating a control signal for preventing the aerosol-generating device from generating an aerosol.

The controller may be further configured to, in response to generating a control signal for controlling operation of the aerosol-generating device, generate an alert. Generating the alert may comprise generating a control signal for controlling an indicator of the aerosol-generating device to provide user-perceptible feedback.

The one or more controllers may be further configured to, in response to generating a control signal for controlling operation of the aerosol-generating device, send a notification to a user device.

The one or more controllers may be further configured to, in response to generating a control signal for controlling operation of the aerosol-generating device, generate a control signal for enabling one or more or all operations of a charging device associated with the aerosol-generating device.

The one or more controllers may be further configured to, in response to generating a control signal for controlling operation of the aerosol-generating device, generate a control signal for preventing one or more or all operations of a charging device associated with the aerosol-generating device.

The one or more biosensors may comprise at least one of a heart-rate monitor, a blood pressure sensor and a motion sensor. The heart-rate monitor may be an electrocardiography sensor, an optical sensor, or a photoplethysmography sensor. The motion sensor may be an accelerometer.

The biometric information may include at least one of a heart rate value, a heart rate signal, an arterial stiffness value, a blood pressure value and motion information.

The system may further comprise a database located on a remote server, wherein the database is configured to store the one or more sets of reference biometric information.

The system may further comprise the remote server, wherein the one or more controllers are configured to wirelessly communicate with the remote server to obtain the set of reference biometric information.

The system may further comprise the aerosol-generating device, wherein the aerosol-generating device comprises at least one of the one or more biometric sensors, a data store configured to store the one or more sets of reference biometric information and at least one of the one or more controllers.

The system may further comprise the aerosol-generating device and a charging device associated with the aerosol-generating device, wherein the aerosol-generating device comprises at least one of the one or more biometric sensors, and wherein the charging device comprises a data store configured to store the one or more sets of reference biometric information and at least one controller of the one or more controllers.

The reference biometric information may be stored in a lookup table.

The system may further comprise a user device, wherein the user device comprises at least one of the one or more biosensors and at least one of the one or more controllers. The user device may be a smartphone or a wearable device.

According to another aspect of the present invention, there is provided a method for controlling operation of an aerosol-generating device. The method may comprise: obtaining, from one or more biosensors, biometric information of a user having an age; analyzing the biometric information obtained by the one or more biosensors to determine whether the age of the user is above or below an age threshold; and generating a control signal for controlling operation of the aerosol-generating device based on whether the age of the user is determined to be above or below the age threshold.

Analyzing the biometric information obtained by the one or more biosensors to determine whether the age of the user is above or below the age threshold may comprise comparing the biometric information obtained by the one or more biosensors to one or more sets of reference biometric information. Comparing the biometric information obtained by the one or more biosensors to the one or more sets of reference biometric information may comprise comparing heart rate signal patterns. Preferably, this may involve comparing one or more heart rate signal patterns obtained by the one or more biosensors to one or more sets of reference heart rate signal patterns.

Analyzing the biometric information to determine whether the age of the user is above or below the age threshold may comprise determining whether a heart rate value obtained from the one or more biosensors is within a predetermined range of values. The predetermined range of values may depend on motion information obtained from the one or more biosensors.

The method may further comprise training a classifier (e.g. a neural network) to classify the biometric information obtained from the one or more biosensors according to age. Analyzing the biometric information obtained by the one or more biosensors to determine whether the age of the user is above or below the age threshold may comprise inputting the biometric information obtained by the one or more biosensors into the trained classifier, such as a trained neural network.

The method may further comprise analyzing the biometric information obtained by the one or more biosensors to identify the user. Analyzing the biometric information obtained by the one or more biosensors to identify the user may comprise comparing the biometric information obtained by the one or more biosensors to one or more sets of reference biometric information. Comparing the biometric information may comprise comparing heart rate signal pattern. Preferably, this may involve comparing one or more heart rate signal patterns obtained by the one or more biosensors to one or more sets of reference heart rate signal patterns.

The method may further comprise training a classifier (e.g. a neural network) to classify the biometric information obtained from the one or more biosensors according user identity. Analyzing the biometric information obtained by the one or more biosensors to identify the user may comprise inputting the biometric information obtained by the one or more biosensors into the trained classifier, such as the trained neural network.

The method may further comprise generating a control signal for locking the aerosol-generating device when the user is not identified as a user of the aerosol-generating device.

The method may further comprise, in response to detecting a user input, generating a control signal for starting a configuration mode of the aerosol-generating device. The configuration mode of the aerosol-generating device may be a pre-heating mode of the aerosol-generating device. The biometric information may be analyzed during the configuration mode. The control signal for controlling operation of the aerosol-generating device may be generated before the end of the configuration mode.

The method may further comprise generating a control signal for locking the aerosol-generating device if no biometric information is obtained from the one or more biosensors before the end of the configuration mode.

Generating a control signal for controlling operation of the aerosol-generating device may comprise generating a control signal for locking the aerosol-generating device.

Generating a control signal for controlling operation of the aerosol-generating device may comprise generating a control signal for unlocking the aerosol-generating device.

Generating a control signal for controlling operation of the aerosol-generating device may comprise generating a control signal for switching off the aerosol-generating device.

Generating a control signal for controlling operation of the aerosol-generating device may comprise generating a control signal for ceasing operation of the aerosol-generating device.

Generating a control signal for controlling operation of the aerosol-generating device may comprise generating a control signal for allowing the aerosol-generating device to generate an aerosol.

Generating a control signal for controlling operation of the aerosol-generating device may comprise generating a control signal for preventing the aerosol-generating device from generating an aerosol.

The method may further comprise, in response to generating a control signal for controlling operation of the aerosol-generating device, generating an alert. Generating the alert may comprise generating a control signal for controlling an indicator of the aerosol-generating device to provide user-perceptible feedback.

The method may further comprise, in response to generating a control signal for controlling operation of the aerosol-generating device, sending a notification to a user device.

The method may further comprise, in response to generating a control signal for controlling operation of the aerosol-generating device, generating a control signal for enabling one or more or all operations of a charging device associated with the aerosol-generating device.

The method may further comprise, in response to generating a control signal for controlling operation of the aerosol-generating device, generating a control signal for preventing one or more or all operations of a charging device associated with the aerosol-generating device.

The one or more biosensors may comprise at least one of a heart-rate monitor, a blood pressure sensor and a motion sensor. The heart-rate monitor may be an electrocardiography sensor, an optical sensor, or a photoplethysmography sensor. The motion sensor may be an accelerometer.

The biometric information may include at least one of a heart rate value, a heart rate signal, an arterial stiffness value, a blood pressure value and motion information.

The method may further comprise storing the one or more sets of reference biometric information at a database located on a remote server.

The method may further comprise wirelessly communicating with the remote server to obtain the set of reference biometric information. The reference biometric information may be stored in a lookup table.

According to another aspect of the present invention, there is provided a system associated with an aerosol-generating device. The system may comprise one or more biosensors configured to obtain biometric information of a user, and the system may comprise one or more controllers. The one or more controllers may be configured to, in response to generating a signal for starting a configuration mode of the aerosol-generating device: determine whether the user is authenticated based on the biometric information, and generate a control signal for controlling operation of the aerosol-generating device based on whether the user is authenticated or not.

Determining whether the user is authenticated during the configuration mode is more efficient because an authenticated user will not notice any interruption in the operation of the device. Furthermore, determining whether the user is authenticated and generating a control signal during the configuration mode is more secure because the aerosol-generating device is being configured for operation during a configuration mode.

The one or more controllers may be configured to generate the control signal for starting the configuration mode of the aerosol-generating device in response to a user input. The user input may be an activation of the aerosol-generating device. The configuration mode may be a pre-heating phase of the aerosol-generating device.

Determining whether the user is authenticated based on the biometric information may comprise analyzing the biometric information to determine whether an age of the user is above or below a predetermined age threshold.

Analyzing the biometric information to determine whether the age of the user is above or below the age threshold may comprise comparing the biometric information obtained by the one or more biosensors to one or more sets of reference biometric information. Comparing the biometric information obtained by the one or more biosensors to the one or more sets of reference biometric information may comprise comparing heart rate signal patterns. Preferably, this may involve comparing one or more heart rate signal patterns obtained by the one or more biosensors to one or more sets of reference heart rate signal patterns.

Analyzing the biometric information to determine whether the age of the user is above or below the age threshold may comprise determining whether a heart rate value obtained from the one or more biosensors is within a predetermined range of values. The predetermined range of values may depend on motion information obtained from the one or more biosensors.

The system may further comprise a trained classifier (e.g. a neural network) trained to classify the biometric information obtained from the one or more biosensors according to age. Analyzing the biometric information obtained by the one or more biosensors to determine whether the age of the user is above or below the age threshold may comprise inputting the biometric information obtained by the one or more biosensors into the trained classifier, such as a trained neural network.

Determining whether the user is authenticated based on the biometric information may comprise analyzing the biometric information to determining an identity of the user. Analyzing the biometric information to determine the identity of the user may comprise comparing the biometric information obtained by the one or more biosensors to one or more sets of reference biometric information. Comparing the biometric information may comprise comparing heart rate signal patterns. Preferably, this may involve comparing one or more heart rate signal patterns obtained by the one or more biosensors to one or more sets of reference heart rate signal patterns.

The system may further comprise a trained classifier (e.g. a neural network) trained to classify the biometric information obtained from the one or more biosensors according user identity. Analyzing the biometric information to determine an identity of the user may comprise inputting the biometric information obtained by the one or more biosensors into the trained classifier, such as the trained neural network.

The one or more controllers may be further configured to generate a control signal for locking the aerosol-generating device when the user is not authenticated.

The one or more controllers may be further configured to, in response to detecting a user input, generate a control signal for starting a configuration mode of the aerosol-generating device. The configuration mode of the aerosol-generating device may be a pre-heating mode of the aerosol-generating device. The one or more controllers may be configured to determine whether the user is authenticated during the configuration mode. The one or more controllers may be configured to generate the control signal for controlling operation of the aerosol-generating device before the end of the configuration mode.

The controller may be configured to generate a control signal for locking the aerosol-generating device if no biometric information is obtained from the one or more biosensors before the end of the configuration mode.

Generating a control signal for controlling operation of the aerosol-generating device may comprise generating a control signal for locking the aerosol-generating device.

Generating a control signal for controlling operation of the aerosol-generating device may comprise generating a control signal for unlocking the aerosol-generating device.

Generating a control signal for controlling operation of the aerosol-generating device may comprise generating a control signal for switching off the aerosol-generating device.

Generating a control signal for controlling operation of the aerosol-generating device may comprise generating a control signal for ceasing operation of the aerosol-generating device.

Generating a control signal for controlling operation of the aerosol-generating device may comprise generating a control signal for allowing the aerosol-generating device to generate an aerosol.

Generating a control signal for controlling operation of the aerosol-generating device may comprise generating a control signal for preventing the aerosol-generating device from generating an aerosol.

The one or more controllers may be further configured to, in response to generating a control signal for controlling operation of the aerosol-generating device, generate an alert. Generating the alert may comprise generating a control signal for controlling an indicator of the aerosol-generating device to provide user-perceptible feedback.

The one or more controllers may be further configured to, in response to generating a control signal for controlling operation of the aerosol-generating device, send a notification to a user device.

The one or more controllers may be further configured to, in response to generating a control signal for controlling operation of the aerosol-generating device, generate a control signal for enabling one or more or all operations of a charging device associated with the aerosol-generating device.

The one or more controllers may be further configured to, in response to generating a control signal for controlling operation of the aerosol-generating device, generate a control signal for preventing one or more or all operations of a charging device associated with the aerosol-generating device.

The one or more biosensors may comprise at least one of a heart-rate monitor, a blood pressure sensor and a motion sensor. The heart-rate monitor may be an electrocardiography sensor, an optical sensor, or a photoplethysmography sensor. The motion sensor may be an accelerometer.

The biometric information may include at least one of a heart rate value, an heart rate signal, an arterial stiffness value, a blood pressure value and motion information.

The system may further comprise a database located on a remote server, wherein the database is configured to store the one or more sets of reference biometric information.

The system may further comprise the remote server, wherein the one or more controllers are configured to wirelessly communicate with the remote server to obtain the set of reference biometric information.

The system may further comprise the aerosol-generating device, wherein the aerosol-generating device comprises at least one of the one or more biometric sensors, a data store configured to store the one or more sets of reference biometric information and at least one of the one or more controllers.

The system may further comprise the aerosol-generating device and a charging device associated with the aerosol-generating device, wherein the aerosol-generating device comprises at least one of the one or more biometric sensors, and wherein the charging device comprises a data store configured to store the one or more sets of reference biometric information and at least one controller of the one or more controllers. The reference biometric information may be stored in a lookup table.

The system may further comprise a user device, wherein the user device comprises at least one of the one or more biosensors and at least one of the one or more controllers. The user device may be a smartphone or a wearable device.

According to another aspect, there is provided method for controlling an aerosol-generating device. The method may comprise: obtaining, from one or more biosensors, biometric information of a user; and, in response to generating a signal for starting a configuration mode of the aerosol-generating device: determining whether the user is authenticated based on the biometric information; and generating a control signal for controlling operation of the aerosol-generating device based on whether the user is authenticated or not.

The method may further comprise generating the control signal for starting the configuration mode of the aerosol-generating device in response to a user input. The user input may be an activation of the aerosol-generating device. The configuration mode may be a pre-heating phase of the aerosol-generating device.

Determining whether the user is authenticated based on the biometric information may comprise analyzing the biometric information to determine whether an age of the user is above or below a predetermined age threshold. Analyzing the biometric information to determine whether the age of the user is above or below the age threshold may comprise comparing the biometric information obtained by the one or more biosensors to one or more sets of reference biometric information. Comparing the biometric information obtained by the one or more biosensors to the one or more sets of reference biometric information may comprise comparing heart rate signal patterns. Preferably, this may involve comparing one or more heart rate signal patterns obtained by the one or more biosensors to one or more sets of reference heart rate signal patterns.

Analyzing the biometric information to determine whether the age of the user is above or below the age threshold may comprise determining whether a heart rate value obtained from the one or more biosensors is within a predetermined range of values. The predetermined range of values may depend on motion information obtained from the one or more biosensors. The method may further comprise training a classifier (e.g. a neural network) to classify the biometric information obtained from the one or more biosensors according to age.

Analyzing the biometric information obtained by the one or more biosensors to determine whether the age of the user is above or below the age threshold may comprise inputting the biometric information obtained by the one or more biosensors into the trained classifier, such as a trained neural network.

Determining whether the user is authenticated based on the biometric information may comprise analyzing the biometric information to determine an identity of the user. Analyzing the biometric information to determine the identity of the user may comprise comparing the biometric information obtained by the one or more biosensors to one or more sets of reference biometric information. Comparing the biometric information may comprise comparing heart rate signal patterns. Preferably, this may involve comparing one or more heart rate signal patterns obtained by the one or more biosensors to one or more sets of reference heart rate signal patterns.

The method may further comprise training a classifier (e.g. a neural network) to classify the biometric information obtained from the one or more biosensors according user identity. Analyzing the biometric information to determine an identity of the user comprises inputting the biometric information obtained by the one or more biosensors into the trained classifier, such as the trained neural network.

The method may further comprise generating a control signal for locking the aerosol-generating device when the user is not authenticated.

The method may further comprise, in response to detecting a user input, generating a control signal for starting a configuration mode of the aerosol-generating device. The configuration mode of the aerosol-generating device may be a pre-heating mode of the aerosol-generating device. Whether the user is authenticated may be determined during the configuration mode. The control signal for controlling operation of the aerosol-generating device may be generated before the end of the configuration mode.

The method may further comprise generating a control signal for locking the aerosol-generating device if no biometric information is obtained from the one or more biosensors before the end of the configuration mode.

Generating a control signal for controlling operation of the aerosol-generating device may comprise generating a control signal for locking the aerosol-generating device.

Generating a control signal for controlling operation of the aerosol-generating device may comprise generating a control signal for unlocking the aerosol-generating device.

Generating a control signal for controlling operation of the aerosol-generating device may comprise generating a control signal for switching off the aerosol-generating device.

Generating a control signal for controlling operation of the aerosol-generating device may comprise generating a control signal for ceasing operation of the aerosol-generating device.

Generating a control signal for controlling operation of the aerosol-generating device may comprise generating a control signal for allowing the aerosol-generating device to generate an aerosol.

Generating a control signal for controlling operation of the aerosol-generating device may comprise generating a control signal for preventing the aerosol-generating device from generating an aerosol.

The method may further comprise, in response to generating a control signal for controlling operation of the aerosol-generating device, generating an alert. Generating the alert may comprise generating a control signal for controlling an indicator of the aerosol-generating device to provide user-perceptible feedback.

The method may further comprise, in response to generating a control signal for controlling operation of the aerosol-generating device, sending a notification to a user device.

The method may further comprise, in response to generating a control signal for controlling operation of the aerosol-generating device, generating a control signal for enabling one or more or all operations of a charging device associated with the aerosol-generating device.

The method may further comprise, in response to generating a control signal for controlling operation of the aerosol-generating device, generating a control signal for preventing one or more pr all operations of a charging device associated with the aerosol-generating device.

The one or more biosensors may comprise at least one of a heart-rate monitor, a blood pressure sensor and a motion sensor. The heart-rate monitor may be an electrocardiography sensor, an optical sensor, or a photoplethysmography sensor. The motion sensor may be an accelerometer.

The biometric information may include at least one of a heart rate value, a heart rate signal, an arterial stiffness value, a blood pressure value and motion information.

The method may further comprise storing the one or more sets of reference biometric information at a database located on a remote server. The method may further comprise wirelessly communicating with the remote server to obtain the set of reference biometric information. The reference biometric information may be stored in a lookup table.

According to another aspect of the present invention, there is provided a computer-readable storage medium having computer-executable instructions stored thereon, which, when executed by a processor, perform the methods described above.

As used herein, the term "aerosol-generating device" refers to a device that interacts with an aerosol-forming substrate to generate an aerosol. An aerosol-generating device may interact with an aerosol-generating article comprising an aerosol-forming substrate. In some examples, the aerosol-generating device may heat the aerosol-forming substrate to facilitate release of volatile compounds from the substrate. An electrically operated aerosol-generating device may comprise an atomizer, such as an electric heater, to heat the aerosol-forming substrate to form an aerosol.

As used herein, the term "aerosol-forming substrate" refers to a substrate capable of releasing volatile compounds that can form an aerosol. The volatile compounds may be released by heating or combusting the aerosol-forming substrate. As an alternative to heating or combustion, in some cases, volatile compounds may be released by a chemical reaction or by a mechanical stimulus, such as ultrasound. The aerosol-forming substrate may be solid or liquid or may comprise both solid and liquid components. An aerosol-forming substrate may be part of an aerosol-generating article.

Preferably, the aerosol-generating device comprises a power supply configured to supply power to the heating element. The power supply preferably comprises a power source. Preferably, the power source is a battery, such as a lithium ion battery. As an alternative, the power source may be another form of charge storage device such as a capacitor. The power source may require recharging. For example, the power source may have sufficient capacity to allow for the continuous generation of aerosol for a period of around six minutes or for a period that is a multiple of six minutes. In another example, the power source may have sufficient capacity to allow for a predetermined number of puffs or discrete activations of the heater assembly.

The power supply may comprise control electronics. The control electronics may comprise a microcontroller. The microcontroller is preferably a programmable microcontroller. The electric circuitry may comprise further electronic components. The electric circuitry may be configured to regulate a supply of power to the heater assembly. Power may be supplied to the heater assembly continuously following activation of the system or may be supplied intermittently, such as on a puff-by-puff basis. The power may be supplied to the heater assembly in the form of pulses of electrical current.

As used herein, the term "susceptor" refers to an element comprising a material that is capable of converting electromagnetic energy into heat. When a susceptor is located in a varying magnetic field, the susceptor is heated. Heating of the susceptor may be the result of at least one of hysteresis losses and eddy currents induced in the susceptor, depending on the electrical and magnetic properties of the susceptor material.

As used herein, the term "user device" refers to a device associated with a user of an aerosol-generating device, such as a mobile device, a smartphone, a laptop, a personal digital assistant, a smart watch or other wearable device.

The invention is defined in the claims. However, below there is provided a non-exhaustive list of non-limiting examples. Any one or more of the features of these examples may be combined with any one or more features of another example, embodiment, or aspect described herein.

Example Ex1: A system associated with an aerosol-generating device, the system comprising: one or more biosensors configured to obtain biometric information of a user having an age; one or more controllers configured to: analyze the biometric information obtained by the one or more biosensors to determine whether the age of the user is above or below an age threshold; and generate a control signal for controlling operation of the aerosol-generating device based on whether the age of the user is determined to be above or below the age threshold.

Example Ex2: The system according to example Ex1, wherein analyzing the biometric information obtained by the one or more biosensors to determine whether the age of the user is above or below the age threshold comprises comparing the biometric information obtained by the one or more biosensors to one or more sets of reference biometric information.

Example Ex3: The system according to example Ex2, wherein comparing the biometric information obtained by the one or more biosensors to the one or more sets of reference biometric information comprises comparing one or more heart rate signal patterns obtained by the one or more biosensors to one or more sets of reference heart rate signal patterns.

Example Ex4: The system according to example Ex1, wherein analyzing the biometric information to determine whether the age of the user is above or below the age threshold comprises determining whether a heart rate value obtained from the one or more biosensors is within a predetermined range of values.

Example Ex5: The system according to example Ex4, wherein the predetermined range of values depends on motion information obtained from the one or more biosensors.

Example Ex6: The system according to example Ex1, further comprising a classifier trained to classify the biometric information obtained from the one or more biosensors according to age.

Example Ex7: The system according to example Ex6, wherein analyzing the biometric information obtained by the one or more biosensors to determine whether the age of the user is above or below the age threshold comprises inputting the biometric information obtained by the one or more biosensors into the trained classifier.

Example Ex8: The system according to any of examples Ex1 to Ex7, wherein the one or more controllers are further configured to analyze the biometric information obtained by the one or more biosensors to identify the user.

Example Ex9: The system according to example Ex8, wherein analyzing the biometric information obtained by the one or more biosensors to identify the user comprises comparing the biometric information obtained by the one or more biosensors to one or more sets of reference biometric information.

Example Ex10: The system according to example Ex9, wherein comparing the biometric information comprises comparing one or more heart rate signal patterns obtained by the one or more biosensors to one or more sets of reference heart rate signal patterns.

Example Ex11: The system according to example Ex8, further comprising a classifier trained to classify the biometric information obtained from the one or more biosensors according user identity.

Example Ex12: The system according to example Ex11, wherein analyzing the biometric information obtained by the one or more biosensors to identify the user comprises inputting the biometric information obtained by the one or more biosensors into the trained classifier.

Example Ex13: The system according to any of examples Ex8 to Ex12, wherein the one or more controllers are further configured to generate a control signal for locking the aerosol-generating device when the user is not identified as a user of the aerosol-generating device.

Example Ex14: The system according to any of examples Ex1 to Ex13, wherein the one or more controllers are further configured to, in response to detecting a user input, generate a control signal for starting a configuration mode of the aerosol-generating device.

Example Ex15: The system according to example Ex14, wherein the configuration mode of the aerosol-generating device is a pre-heating mode of the aerosol-generating device.

Example Ex16: The system according to example Ex14 or Ex15, wherein the one or more controllers are configured to analyze the biometric information during the configuration mode.

Example Ex17: The system according to any of examples Ex14 to Ex16, wherein the one or more controllers are configured to generate the control signal for controlling operation of the aerosol-generating device before the end of the configuration mode.

Example Ex18: The system according to any of examples Ex14 to Ex17, wherein the one or more controllers are configured to generate a control signal for locking the aerosol-generating device if no biometric information is obtained from the one or more biosensors before the end of the configuration mode.

Example Ex19: The system according to any of examples Ex1 to Ex18, wherein generating a control signal for controlling operation of the aerosol-generating device comprises generating a control signal for locking the aerosol-generating device.

Example Ex20: The system according to any of examples Ex1 to Ex18, wherein generating a control signal for controlling operation of the aerosol-generating device comprises generating a control signal for unlocking the aerosol-generating device.

Example Ex21: The system according to any of examples Ex1 to Ex18, wherein generating a control signal for controlling operation of the aerosol-generating device comprises generating a control signal for switching off the aerosol-generating device.

Example Ex22: The system according to any of examples Ex1 to Ex18, wherein generating a control signal for controlling operation of the aerosol-generating device comprises generating a control signal for ceasing operation of the aerosol-generating device.

Example Ex23: The system according to any of examples Ex1 to Ex18, wherein generating a control signal for controlling operation of the aerosol-generating device comprises generating a control signal for allowing the aerosol-generating device to generate an aerosol.

Example Ex24: The system according to any of examples Ex1 to Ex18, wherein generating a control signal for controlling operation of the aerosol-generating device comprises generating a control signal for preventing the aerosol-generating device from generating an aerosol.

Example Ex25: The system according to any of examples Ex1 to Ex24, wherein the one or more controllers are further configured to, in response to generating a control signal for controlling operation of the aerosol-generating device, generate an alert.

Example Ex26: The system according to example Ex25, wherein generating the alert comprises generating a control signal for controlling an indicator of the aerosol-generating device to provide user-perceptible feedback.

Example Ex27: The system according to one of examples Ex1 to Ex26, wherein the one or more controllers are further configured to, in response to generating a control signal for controlling operation of the aerosol-generating device, send a notification to a user device.

Example Ex28: The system according to one of examples Ex1 to Ex27, wherein the one or more controllers are further configured to, in response to generating a control signal for controlling operation of the aerosol-generating device, generate a control signal for enabling one or more or all operations of a charging device associated with the aerosol-generating device.

Example Ex29: The system according to one of examples Ex1 to Ex27, wherein the one or more controllers are further configured to, in response to generating a control signal for controlling operation of the aerosol-generating device, generate a control signal for preventing one or more or all operations of a charging device associated with the aerosol-generating device.

Example Ex30: The system according to any of examples Ex1 to Ex29, wherein the one or more biosensors comprise at least one of a heart-rate monitor, a blood pressure sensor and a motion sensor.

Example Ex31: The system according to example Ex30, wherein the heart-rate monitor is an electrocardiography sensor, an optical sensor, or a photoplethysmography sensor.

Example Ex32: The system according to example Ex30 or Ex31, wherein the motion sensor is an accelerometer.

Example Ex33: The system according to any of examples Ex1 to Ex32, wherein the biometric information includes at least one of a heart rate value, an heart rate signal, an arterial stiffness value, a blood pressure value and motion information.

Example Ex34: The system according to any of examples Ex1 to Ex33, further comprising a database located on a remote server, wherein the database is configured to store the one or more sets of reference biometric information.

Example Ex35: The system according to example Ex34, further comprising the remote server, wherein the one or more controllers are configured to wirelessly communicate with the remote server to obtain the set of reference biometric information.

Example Ex36: The system according to any of examples Ex1 to Ex33, further comprising the aerosol-generating device, wherein the aerosol-generating device comprises at least one of the one or more biometric sensors, a data store configured to store the one or more sets of reference biometric information and at least one of the one or more controllers.

Example Ex37: The system according to any of examples Ex1 to Ex33, further comprising the aerosol-generating device and a charging device associated with the aerosol-generating device, wherein the aerosol-generating device comprises at least one of the one or more biometric sensors, and wherein the charging device comprises a data store configured to store the one or more sets of reference biometric information and at least one controller of the one or more controllers.

Example Ex38: The system according to any of examples Ex34 to Ex37, wherein the reference biometric information is stored in a lookup table.

Example Ex39: The system according to any of examples Ex1 to Ex38, further comprising a user device, wherein the user device comprises at least one of the one or more biosensors and at least one of the one or more controllers.

Example Ex40: The system according to example Ex39, wherein the user device is a smartphone or a wearable device.

Example Ex41: A method for controlling operation of an aerosol-generating device, the method comprising: obtaining, from one or more biosensors, biometric information of a user having an age; analyzing the biometric information obtained by the one or more biosensors to determine whether the age of the user is above or below an age threshold; and generating a control signal for controlling operation of the aerosol-generating device based on whether the age of the user is determined to be above or below the age threshold.

Example Ex42: The method according to example Ex41, wherein analyzing the biometric information obtained by the one or more biosensors to determine whether the age of the user is above or below the age threshold comprises comparing the biometric information obtained by the one or more biosensors to one or more sets of reference biometric information.

Example Ex43: The method according to example Ex42, wherein comparing the biometric information obtained by the one or more biosensors to the one or more sets of reference biometric information comprises comparing one or more heart rate signal patterns obtained by the one or more biosensors to one or more sets of reference heart rate signal patterns.

Example Ex44: The method according to example Ex41, wherein analyzing the biometric information to determine whether the age of the user is above or below the age threshold comprises determining whether a heart rate value obtained from the one or more biosensors is within a predetermined range of values.

Example Ex45: The method according to example Ex44, wherein the predetermined range of values depends on motion information obtained from the one or more biosensors.

Example Ex46: The method according to example Ex41, further comprising training a classifier to classify the biometric information obtained from the one or more biosensors according to age.

Example Ex47: The method according to example Ex46, wherein analyzing the biometric information obtained by the one or more biosensors to determine whether the age of the user is above or below the age threshold comprises inputting the biometric information obtained by the one or more biosensors into the trained classifier.

Example Ex48: The method according to any of examples Ex41 to Ex47, further comprising analyzing the biometric information obtained by the one or more biosensors to identify the user.

Example Ex49: The method according to example Ex48, wherein analyzing the biometric information obtained by the one or more biosensors to identify the user comprises comparing the biometric information obtained by the one or more biosensors to one or more sets of reference biometric information.

Example Ex50: The method according to example Ex49, wherein comparing the biometric information comprises comparing one or more heart rate signal patterns obtained by the one or more biosensors to one or more sets of reference heart rate signal patterns.

Example Ex51: The method according to example Ex48, further comprising training a classifier to classify the biometric information obtained from the one or more biosensors according user identity.

Example Ex52: The method according to example Ex51, wherein analyzing the biometric information obtained by the one or more biosensors to identify the user comprises inputting the biometric information obtained by the one or more biosensors into the trained classifier.

Example Ex53: The method according to any of examples Ex48 to Ex52, further comprising generating a control signal for locking the aerosol-generating device when the user is not identified as a user of the aerosol-generating device.

Example Ex54: The method according to any of examples Ex41 to Ex53, further comprising, in response to detecting a user input, generating a control signal for starting a configuration mode of the aerosol-generating device.

Example Ex55: The method according to example Ex54, wherein the configuration mode of the aerosol-generating device is a pre-heating mode of the aerosol-generating device.

Example Ex56: The method according to example Ex54 or Ex55, wherein the biometric information is analyzed during the configuration mode.

Example Ex57: The method according to any of examples Ex54 to Ex56, the control signal for controlling operation of the aerosol-generating device is generated before the end of the configuration mode.

Example Ex58: The method according to any of examples Ex54 to Ex57, further comprising generating a control signal for locking the aerosol-generating device if no biometric information is obtained from the one or more biosensors before the end of the configuration mode.

Example Ex59: The method according to any of examples Ex41 to Ex58, wherein generating a control signal for controlling operation of the aerosol-generating device comprises generating a control signal for locking the aerosol-generating device.

Example Ex60: The method according to any of examples Ex41 to Ex58, wherein generating a control signal for controlling operation of the aerosol-generating device comprises generating a control signal for unlocking the aerosol-generating device.

Example Ex61: The method according to any of examples Ex41 to Ex58, wherein generating a control signal for controlling operation of the aerosol-generating device comprises generating a control signal for switching off the aerosol-generating device.

Example Ex62: The method according to any of examples Ex41 to Ex58, wherein generating a control signal for controlling operation of the aerosol-generating device comprises generating a control signal for ceasing operation of the aerosol-generating device.

Example Ex63: The method according to any of examples Ex41 to Ex58, wherein generating a control signal for controlling operation of the aerosol-generating device comprises generating a control signal for allowing the aerosol-generating device to generate an aerosol.

Example Ex64: The method according to any of examples Ex41 to Ex58, wherein generating a control signal for controlling operation of the aerosol-generating device comprises generating a control signal for preventing the aerosol-generating device from generating an aerosol.

Example Ex65: The method according to any of examples Ex41 to Ex64, wherein further comprising, in response to generating a control signal for controlling operation of the aerosol-generating device, generating an alert.

Example Ex66: The method according to example Ex65, wherein generating the alert comprises generating a control signal for controlling an indicator of the aerosol-generating device to provide user-perceptible feedback.

Example Ex67: The method according to one of examples Ex41 to Ex66, further comprising, in response to generating a control signal for controlling operation of the aerosol-generating device, sending a notification to a user device.

Example Ex68: The method according to one of examples Ex41 to Ex67, further comprising, in response to generating a control signal for controlling operation of the aerosol-generating device, generating a control signal for enabling one or more or all operations of a charging device associated with the aerosol-generating device.

Example Ex69: The method according to one of examples Ex41 to Ex67, further comprising, in response to generating a control signal for controlling operation of the aerosol-generating device, generating a control signal for preventing one or more or all operations of a charging device associated with the aerosol-generating device.

Example Ex70: The method according to any of examples Ex41 to Ex69, wherein the one or more biosensors comprise at least one of a heart-rate monitor, a blood pressure sensor and a motion sensor.

Example Ex71: The method according to example Ex70, wherein the heart-rate monitor is an electrocardiography sensor, an optical sensor, or a photoplethysmography sensor.

Example Ex72: The method according to example Ex70 or Ex71, wherein the motion sensor is an accelerometer.

Example Ex73: The method according to any of examples Ex41 to Ex72, wherein the biometric information includes at least one of a heart rate value, an heart rate signal, an arterial stiffness value, a blood pressure value and motion information.

Example Ex74: The method according to any of examples Ex41 to Ex73, further comprising storing the one or more sets of reference biometric information at a database located on a remote server.

Example Ex75: The method according to example Ex74, further comprising wirelessly communicating with the remote server to obtain the set of reference biometric information.

Example Ex76: The method according to example Ex74 or Ex75, wherein the reference biometric information is stored in a lookup table.

Example Ex77: A computer-readable storage medium having computer-executable instructions stored thereon, which, when executed by a processor, perform the method of one of examples Ex41 to Ex76.

Example Ex78: A system associated with an aerosol-generating device, the system comprising: one or more biosensors configured to obtain biometric information of a user; one or more controllers configured to, in response to generating a signal for starting a configuration mode of the aerosol-generating device: determine whether the user is authenticated based on the biometric information; and generate a control signal for controlling operation of the aerosol-generating device based on whether the user is authenticated or not.

Example Ex79: The system according to example Ex78, wherein the one or more controllers are configured to generate the control signal for starting the configuration mode of the aerosol-generating device in response to a user input.

Example Ex80: The system according to example Ex79, wherein the user input is an activation of the aerosol-generating device.

Example Ex81: The system according to any of examples Ex78 to Ex81, wherein the configuration mode is a pre-heating phase of the aerosol-generating device.

Example Ex82: The system according to any of examples Ex78 to Ex83, wherein determining whether the user is authenticated based on the biometric information comprises analyzing the biometric information to determine whether an age of the user is above or below a predetermined age threshold.

Example Ex83: The system according to example Ex72, wherein analyzing the biometric information to determine whether the age of the user is above or below the age threshold comprises comparing the biometric information obtained by the one or more biosensors to one or more sets of reference biometric information.

Example Ex84: The system according to example Ex73, wherein comparing the biometric information obtained by the one or more biosensors to the one or more sets of reference biometric information comprises comparing one or more heart rate signal patterns obtained by the one or more biosensors to one or more sets of reference heart rate signal patterns.

Example Ex85: The system according to example Ex72, wherein analyzing the biometric information to determine whether the age of the user is above or below the age threshold comprises determining whether a heart rate value obtained from the one or more biosensors is within a predetermined range of values.

Example Ex86: The system according to example Ex75, wherein the predetermined range of values depends on motion information obtained from the one or more biosensors.

Example Ex87: The system according to example Ex72, further comprising a classifier trained to classify the biometric information obtained from the one or more biosensors according to age.

Example Ex88: The system according to example Ex87, wherein analyzing the biometric information obtained by the one or more biosensors to determine whether the age of the user is above or below the age threshold comprises inputting the biometric information obtained by the one or more biosensors into the trained classifier.

Example Ex89: The system according to any of examples Ex78 to Ex88, wherein determining whether the user is authenticated based on the biometric information comprises analyzing the biometric information to determine an identity of the user.

Example Ex90: The system according to example Ex89, wherein analyzing the biometric information to determine the identity of the user comprises comparing the biometric information obtained by the one or more biosensors to one or more sets of reference biometric information.

Example Ex91: The system according to example Ex90, wherein comparing the biometric information comprises comparing one or more heart rate signal patterns obtained by the one or more biosensors to one or more sets of reference heart rate signal patterns.

Example Ex92: The system according to example Ex89, further comprising a classifier trained to classify the biometric information obtained from the one or more biosensors according user identity.

Example Ex93: The system according to example Ex92, wherein analyzing the biometric information to determine an identity of the user comprises inputting the biometric information obtained by the one or more biosensors into the trained classifier.

Example Ex94: The system according to any of examples Ex78 to Ex93, wherein the one or more controllers are further configured to generate a control signal for locking the aerosol-generating device when the user is not authenticated.

Example Ex95: The system according to any of examples Ex78 to Ex94, wherein the one or more controllers are further configured to, in response to detecting a user input, generate a control signal for starting a configuration mode of the aerosol-generating device.

Example Ex96: The system according to example Ex95, wherein the configuration mode of the aerosol-generating device is a pre-heating mode of the aerosol-generating device.

Example Ex97: The system according to example Ex95 or Ex96, wherein the one or more controllers are configured to determine whether the user is authenticated during the configuration mode.

Example Ex98: The system according to any of examples Ex95 to Ex97, wherein the one or more controllers are configured to generate the control signal for controlling operation of the aerosol-generating device before the end of the configuration mode.

Example Ex99: The system according to any of examples Ex95 to Ex98, wherein the one or more controllers are configured to generate a control signal for locking the aerosol-generating device if no biometric information is obtained from the one or more biosensors before the end of the configuration mode.

Example Ex100: The system according to any of examples Ex78 to Ex99, wherein generating a control signal for controlling operation of the aerosol-generating device comprises generating a control signal for locking the aerosol-generating device.

Example Ex101: The system according to any of examples Ex78 to Ex99, wherein generating a control signal for controlling operation of the aerosol-generating device comprises generating a control signal for unlocking the aerosol-generating device.

Example Ex102: The system according to any of examples Ex78 to Ex99, wherein generating a control signal for controlling operation of the aerosol-generating device comprises generating a control signal for switching off the aerosol-generating device.

Example Ex103: The system according to any of examples Ex78 to Ex99, wherein generating a control signal for controlling operation of the aerosol-generating device comprises generating a control signal for ceasing operation of the aerosol-generating device.

Example Ex104: The system according to any of examples Ex78 to Ex99, wherein generating a control signal for controlling operation of the aerosol-generating device comprises generating a control signal for allowing the aerosol-generating device to generate an aerosol.

Example Ex105: The system according to any of examples Ex78 to Ex99, wherein generating a control signal for controlling operation of the aerosol-generating device comprises generating a control signal for preventing the aerosol-generating device from generating an aerosol.

Example Ex106: The system according to any of examples Ex78 to Ex105, wherein the one or more controllers are further configured to, in response to generating a control signal for controlling operation of the aerosol-generating device, generate an alert.

Example Ex107: The system according to example Ex106, wherein generating the alert comprises generating a control signal for controlling an indicator of the aerosol-generating device to provide user-perceptible feedback.

Example Ex108: The system according to one of examples Ex78 to Ex107, wherein the one or more controllers are further configured to, in response to generating a control signal for controlling operation of the aerosol-generating device, send a notification to a user device.

Example Ex109: The system according to one of examples Ex78 to Ex108, wherein the one or more controllers are further configured to, in response to generating a control signal for controlling operation of the aerosol-generating device, generate a control signal for enabling one or more or all operations of a charging device associated with the aerosol-generating device.

Example Ex110: The system according to one of examples Ex78 to Ex108, wherein the one or more controllers are further configured to, in response to generating a control signal for controlling operation of the aerosol-generating device, generate a control signal for preventing one or more or all operations of a charging device associated with the aerosol-generating device.

Example Ex111: The system according to any of examples Ex78 to Ex110, wherein the one or more biosensors comprise at least one of a heart-rate monitor, a blood pressure sensor and a motion sensor.

Example Ex112: The system according to example Ex111, wherein the heart-rate monitor is an electrocardiography sensor, an optical sensor, or a photoplethysmography sensor.

Example Ex113: The system according to example Ex111 or Ex112, wherein the motion sensor is an accelerometer.

Example Ex114: The system according to any of examples Ex78 to Ex113, wherein the biometric information includes at least one of a heart rate value, an heart rate signal, an arterial stiffness value, a blood pressure value and motion information.

Example Ex115: The system according to any of examples Ex78 to Ex114, further comprising a database located on a remote server, wherein the database is configured to store the one or more sets of reference biometric information.

Example Ex116: The system according to example Ex115, further comprising the remote server, wherein the one or more controllers are configured to wirelessly communicate with the remote server to obtain the set of reference biometric information.

Example Ex117: The system according to any of examples Ex78 to Ex114, further comprising the aerosol-generating device, wherein the aerosol-generating device comprises at least one of the one or more biometric sensors, a data store configured to store the one or more sets of reference biometric information and at least one of the one or more controllers.

Example Ex118: The system according to any of examples Ex78 to Ex114, further comprising the aerosol-generating device and a charging device associated with the aerosol-generating device, wherein the aerosol-generating device comprises at least one of the one or more biometric sensors, and wherein the charging device comprises a data store configured to store the one or more sets of reference biometric information and at least one controller of the one or more controllers.

Example Ex119: The system according to any of examples Ex114 to Ex118, wherein the reference biometric information is stored in a lookup table.

Example Ex120: The system according to any of examples Ex78 to Ex119, further comprising a user device, wherein the user device comprises at least one of the one or more biosensors and at least one of the one or more controllers.

Example Ex121: The system according to example Ex120, wherein the user device is a smartphone or a wearable device.

Example Ex122: A method for controlling an aerosol-generating device, the method comprising: obtaining, from one or more biosensors, biometric information of a user; and in response to generating a signal for starting a configuration mode of the aerosol-generating device: determining whether the user is authenticated based on the biometric information; and generating a control signal for controlling operation of the aerosol-generating device based on whether the user is authenticated or not.

Example Ex123: The method according to example Ex122, further comprising generating the control signal for starting the configuration mode of the aerosol-generating device in response to a user input.

Example Ex124: The method according to example Ex123, wherein the user input is an activation of the aerosol-generating device.

Example Ex125: The method according to any of examples Ex122 to Ex124, wherein the configuration mode is a pre-heating phase of the aerosol-generating device.

Example Ex126: The method according to any of examples Ex122 to Ex125, wherein determining whether the user is authenticated based on the biometric information comprises analyzing the biometric information to determine whether an age of the user is above or below a predetermined age threshold.

Example Ex127: The method according to example Ex126, wherein analyzing the biometric information to determine whether the age of the user is above or below the age threshold comprises comparing the biometric information obtained by the one or more biosensors to one or more sets of reference biometric information.

Example Ex128: The method according to example Ex127, wherein comparing the biometric information obtained by the one or more biosensors to the one or more sets of reference biometric information comprises comparing one or more heart rate signal patterns obtained by the one or more biosensors to one or more sets of reference heart rate signal patterns.

Example Ex129: The method according to example Ex126, wherein analyzing the biometric information to determine whether the age of the user is above or below the age threshold comprises determining whether a heart rate value obtained from the one or more biosensors is within a predetermined range of values.

Example Ex130: The method according to example Ex129, wherein the predetermined range of values depends on motion information obtained from the one or more biosensors.

Example Ex131: The method according to example Ex126, further comprising training a classifier to classify the biometric information obtained from the one or more biosensors according to age.

Example Ex132: The method according to example Ex131, wherein analyzing the biometric information obtained by the one or more biosensors to determine whether the age of the user is above or below the age threshold comprises inputting the biometric information obtained by the one or more biosensors into the trained classifier.

Example Ex133: The method according to any of examples Ex122 to Ex132, wherein determining whether the user is authenticated based on the biometric information comprises analyzing the biometric information to determine an identity of the user.

Example Ex134: The method according to example Ex133, wherein analyzing the biometric information to determine the identity of the user comprises comparing the biometric information obtained by the one or more biosensors to one or more sets of reference biometric information.

Example Ex135: The method according to example Ex134, wherein comparing the biometric information comprises comparing one or more heart rate signal patterns obtained by the one or more biosensors to one or more sets of reference heart rate signal patterns.

Example Ex136: The method according to example Ex133, further comprising training a classifier to classify the biometric information obtained from the one or more biosensors according user identity.

Example Ex137: The method according to example Ex136, wherein analyzing the biometric information to determine an identity of the user comprises inputting the biometric information obtained by the one or more biosensors into the trained classifier.

Example Ex138: The method according to any of examples Ex122 to Ex136, further comprising generating a control signal for locking the aerosol-generating device when the user is not authenticated.

Example Ex139: The method according to any of examples Ex177 to Ex138, further comprising, in response to detecting a user input, generating a control signal for starting a configuration mode of the aerosol-generating device.

Example Ex140: The method according to example Ex139, wherein the configuration mode of the aerosol-generating device is a pre-heating mode of the aerosol-generating device.

Example Ex141: The method according to example Ex139 or Ex140, wherein it is whether the user is authenticated is determined during the configuration mode.

Example Ex142: The method according to any of examples Ex139 to Ex141, wherein the control signal for controlling operation of the aerosol-generating device is generated before the end of the configuration mode.

Example Ex143: The method according to any of examples Ex139 to Ex142, further comprising generating a control signal for locking the aerosol-generating device if no biometric information is obtained from the one or more biosensors before the end of the configuration mode.

Example Ex144: The method according to any of examples Ex122 to Ex143, wherein generating a control signal for controlling operation of the aerosol-generating device comprises generating a control signal for locking the aerosol-generating device.

Example Ex145: The method according to any of examples Ex122 to Ex143, wherein generating a control signal for controlling operation of the aerosol-generating device comprises generating a control signal for unlocking the aerosol-generating device.

Example Ex146: The method according to any of examples Ex122 to Ex143, wherein generating a control signal for controlling operation of the aerosol-generating device comprises generating a control signal for switching off the aerosol-generating device.

Example Ex147: The method according to any of examples Ex122 to Ex143, wherein generating a control signal for controlling operation of the aerosol-generating device comprises generating a control signal for ceasing operation of the aerosol-generating device.

Example Ex148: The method according to any of examples Ex122 to Ex143, wherein generating a control signal for controlling operation of the aerosol-generating device comprises generating a control signal for allowing the aerosol-generating device to generate an aerosol.

Example Ex149: The method according to any of examples Ex122 to Ex143, wherein generating a control signal for controlling operation of the aerosol-generating device comprises generating a control signal for preventing the aerosol-generating device from generating an aerosol.

Example Ex150: The method according to any of examples Ex122 to Ex143, further comprising, in response to generating a control signal for controlling operation of the aerosol-generating device, generating an alert.

Example Ex151: The method according to example Ex150, wherein generating the alert comprises generating a control signal for controlling an indicator of the aerosol-generating device to provide user-perceptible feedback.

Example Ex152: The method according to one of examples Ex122 to Ex152, further comprising, in response to generating a control signal for controlling operation of the aerosol-generating device, sending a notification to a user device.

Example Ex153: The method according to one of examples Ex122 to Ex152, wherein further comprising, in response to generating a control signal for controlling operation of the aerosol-generating device, generating a control signal for enabling one or more or all operations of a charging device associated with the aerosol-generating device.

Example Ex154: The method according to one of examples Ex122 to Ex152, further comprising, in response to generating a control signal for controlling operation of the aerosol-generating device, generating a control signal for preventing one or more or all operations of a charging device associated with the aerosol-generating device.

Example Ex155: The method according to any of examples Ex122 to Ex154, wherein the one or more biosensors comprise at least one of a heart-rate monitor, a blood pressure sensor and a motion sensor.

Example Ex156: The method according to example Ex155, wherein the heart-rate monitor is an electrocardiography sensor, an optical sensor, or a photoplethysmography sensor.

Example Ex157: The method according to example Ex155 or Ex156, wherein the motion sensor is an accelerometer.

Example Ex158: The method according to any of examples Ex122 to Ex157, wherein the biometric information includes at least one of a heart rate value, an heart rate signal, an arterial stiffness value, a blood pressure value and motion information.

Example Ex159: The method according to any of examples Ex122 to Ex158, further comprising storing the one or more sets of reference biometric information at a database located on a remote server.

Example Ex160: The method according to example Ex159, further comprising wirelessly communicating with the remote server to obtain the set of reference biometric information.

Example Ex161: The method according to example Ex159 or Ex160, wherein the reference biometric information is stored in a lookup table.

Example Ex162: A computer-readable storage medium having computer-executable instructions stored thereon, which, when executed by a processor, perform the method of one of examples Ex122 to Ex161.

Examples will now be further described with reference to the figures in which:

FIG. 1 illustrates a control system 100 associated with an aerosol-generating device.

Figure 1:
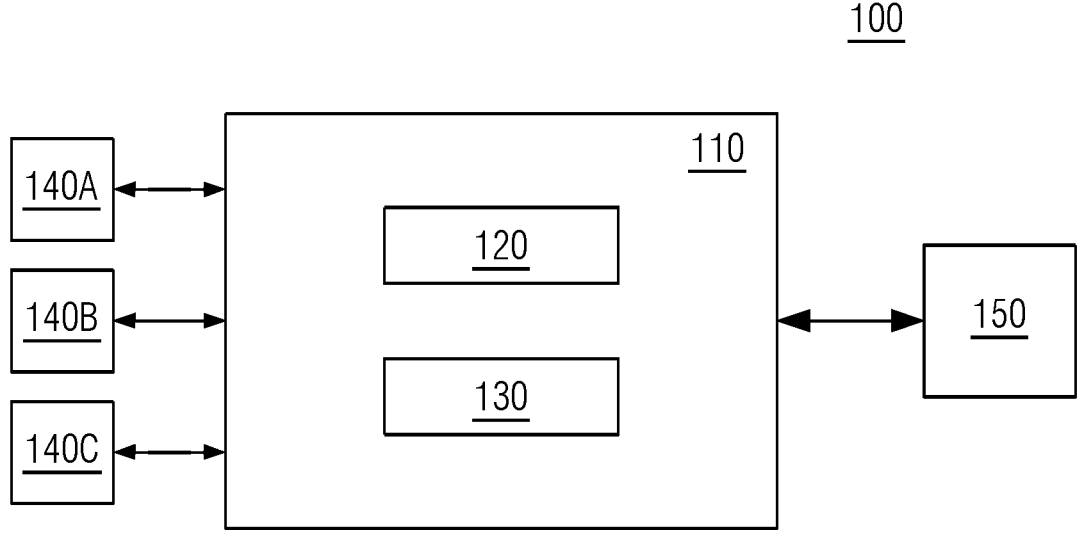
FIG. 1 shows a control system associated with an aerosol-generating device.

System 100 comprises a controller 110, one or more biosensors 140A-C and a data store 150. The controller 110 is configured to authenticate a user of the aerosol-generating device based on biometric information obtained by the one or more biosensors 140A-C. Based on the authentication, the controller 110 is configured to generate one or more control signals for controlling operation of the aerosol-generating device. The controller 100 comprises a memory 120 for storing instructions for carrying out the authentication of the user and generating the control signals. The controller 110 further comprises one or more processors 130 configured to execute the instructions stored on the memory 120.

The one or more biosensors 140A-C may use any suitable method to measure biometric information of the user. The one or more biosensors 140A-C may include a heart-rate monitor, such as at least one of an electrocardiography sensor, an optical sensor and a photoplethysmography sensor. For example, the one or more biosensors 140A-C may comprise at least one light source, such as a light-emitting diode that emits green or infrared light, and one or more sensors that detect the light emitted from the at least one light source and reflected from the skin of the user, which may be used for photoplethysmography or other biosensing. The one or more biosensors 140A-C may include a blood pressure sensor and a motion sensor. The motion sensor may be an accelerometer. The biometric information measured by the one or more biosensors 140A-C may include biological characteristics of a user such as at least one of heart rate, blood pressure, arterial stiffness, oxygen saturation, carbon monoxide saturation, and motion information.

The controller 110 analyzes the biometric information obtained by the one or more biosensors 140A-C to authenticate the user. Authenticating the user may comprise determining that the user's age is above a predetermined age threshold. Additionally or alternatively, authenticating the user may comprise identifying the user. The received biometric information may be stored in the memory 120 of the controller 110.

Analyzing the biometric information obtained by the one or more biosensors 140A-C may comprise comparing the biometric information to one or more sets of reference biometric information stored by one or more data stores. The one or more data stores may include the memory 130 of the controller. Additionally or alternatively, the one or more data stores may include one or more remote data stores 150. Remote data store 150 may be a memory of a device, such as a user device or a charging device associated with the aerosol-generating device. Additionally or alternatively, a remote data store 150 may be a database located at a remote server. The controller 110 may be configured to communicate with the remote data store 150 wirelessly or in a wired manner.

The reference biometric information may be categorized in accordance with age. At least some of the one or more sets of reference biometric information may correspond to age-dependent groups of users. For example, a first set of reference biometric information may consist of biometric information for a first group of users having a first range of ages. A second set of reference biometric information may consist of biometric information for a second group of users having a second range of ages. The first range of ages may be ages below a threshold age value. The second range of ages may be ages above and including the threshold age value.

The reference biometric information may be categorized in accordance with user identity. At least some of the one or more sets of reference biometric information may correspond to identity profiles for specific users. For example, a third set of reference biometric information may consist of biometric information corresponding to a first user. A fourth set of reference biometric information may consist of biometric information corresponding to a second user and so on.

The reference biometric information may be categorized by indexing the reference biometric information or by tagging the reference biometric information. The reference biometric information may be stored in any suitable manner for quick and efficient retrieval by the controller 100, such as in a look-up table.

The reference biometric information may be obtained in any suitable manner. For example, reference biometric information corresponding to an individual user may be obtained during a registration process of the aerosol-generating device. The user may be required to register the aerosol-generating device with a website or application when the aerosol-generating device is switched on or activated by the user for the first time. The registration may include the user providing biometric information, via the one or more biometric sensors 140A-C, that is stored as reference biometric information. The registration may additionally include the user inputting the user's age or confirming that the user has an age above a threshold age value via a user interface of the website or application.

The controller 110 may analyze the biometric information obtained from the one or more biometric sensors 140A-C by comparing the biometric information to the one or more sets of reference biometric information. The analyzing may be performed using a comparison algorithm stored on the memory 120 of the controller 110.

For example, where the biometric information comprises heart-rate signal patterns, a heart-rate signal pattern obtained from the one or more biosensors 140A-C may be compared with reference heart-rate signal patterns. More specifically, a heart-rate signal pattern obtained from the one or more biosensors 140A-C may be compared with a plurality of sets of reference heart-rate signal patterns, where each reference heart-rate signal pattern corresponds to a different age group. The heart-rate signal pattern obtained from the one or more biosensors 140A-C may be compared with one or more reference heart-rate signal patterns for an individual user to whom the aerosol-generating device is registered. The heart-rate signal pattern obtained from the one or more biosensors 140A-C may be compared with a plurality of reference heart-rate signal patterns for an individual users.

Where the biometric information comprises a heart-rate value, the controller 110 may determine whether the measured heart rate value is within a predetermined range of heart-rate values for an age group or for an individual user.

The biometric information analyzed by the controller may comprise more than one type of biometric information. The controller 110 may therefore be configured to authenticate the user based on a combination of two or more types of biometric information. For example, a heart-rate signal pattern and a blood pressure value may be compared with one or more reference heart-rate signal patterns associated with the same blood pressure value or a range of blood pressure values comprising the blood pressure value. Where the biometric information comprises a heart-rate value that is compared to a predetermined range of heart-rate values, the predetermined range of heart-rate values for an age group or individual user may depend on one or more of motion (for example, whether the range of values corresponds to a resting heart-rate or an active, non-resting, heart-rate) and blood pressure.

The controller 110 may analyze the biometric information obtained from the one or more biometric sensors 140A-C by inputting the biometric information into a classifier (for example, a neural network) that has been trained to classify biometric information according to one or more biological characteristics of a user. The one or more biological characteristics of a user may comprise one or more of an age of the user and an identity of a user. The classifier may be located at a remote server communicatively coupled to the controller 110. The controller 110 may send the biometric information received from the one or more biosensors 140A-C to the classifier. The classifier may process the biometric information received from the controller 110 to classify the biometric information.

The one or more sets of reference biometric information may be used to train the classifier either in a supervised or semi-supervised manner. Supervised learning comprises providing the classifier with labelled training examples so that the classifier model that analyzes each of the training examples to produce a prediction for the respective label. Each labelled training example is a pair consisting of an input and a corresponding known output. The model should be able to generalize from training examples to unseen data by classifying new features into labels. Semi-supervised training comprises providing training data consisting of labelled training examples and unlabelled data to produce a prediction.

Based on the analyzing of the biometric data, the controller 110 is configured to generate a control signal for controlling operation of the aerosol-generating device. Preferably, the controller 110 generates a control signal that prevents usage of the device by an unauthenticated user (for example, a user having an age below a predetermined age and additionally or alternatively a user that is not a pre-registered user of the device). Additionally or alternatively, the controller 110 generates a control signal that enables usage of the device by an authenticated user (for example, a user having an age above a predetermined age and additionally or alternatively a user that is a pre-registered user of the device).

Thus, generating a control signal for controlling operation of the aerosol-generating device may comprise generating a control signal for locking the aerosol-generating device if the aerosol-generating device is in an unlocked state. An unlocked state means that the aerosol-generating device is operable by a user for generating an aerosol. Generating a control signal for controlling operation of the aerosol-generating device may comprise generating a control signal for unlocking the aerosol-generating device if the aerosol-generating device is in a locked state, where a locked state means that the aerosol-generating device is not operable by a user for generating an aerosol. Generating a control signal for controlling operation of the aerosol-generating device may comprise one or more of generating a control signal to switch off the aerosol-generating device, generating a control signal to cease operation of the aerosol-generating device, generating a control signal to allow the aerosol-generating device to generate an aerosol and generating a control signal to prevent the aerosol-generating device from generating an aerosol.

Further, the controller 110 may be configured to generate an alert in response to the determining or in response to generating the control signal. Generating an alert may comprise generating a control signal for controlling an indicator of the aerosol-generating device to provide user-perceptible feedback. User-perceptible feedback may comprise one or more of haptic feedback or visual feedback. Visual feedback may include one or more light emitters of the aerosol-generating device changing color, flashing or emitting light in a predefined pattern. Generating an alert may additionally or alternatively comprise sending a notification to a user device.

The controller 110 may additionally be configured to, in response to generating the control signal for controlling operation of the aerosol-generating device, generate a control signal for enabling or preventing one or more or all operations of a charging device associated with an aerosol-generating device. For example, the controller 110 may generate a control signal for enabling the charging device to charge the aerosol-generating device. The controller 110 may generate a control signal for preventing the charging device to charge the aerosol-generating device.

The controller 110 may be configured to analyze the biometric data and generate the control signal during a configuration mode of the aerosol-generating device. During the configuration mode, the aerosol-generating device may be configured for use by the user. For example, the configuration mode may be a pre-heating mode in which the aerosol-generating device, specifically a heating element of the aerosol-generating device, is heated to reach an operating temperature. The configuration mode may be launched in response to a user input. For example, the configuration mode may be launched in response to a user input to switch on the aerosol-generating device. When the controller 110 is comprised within the aerosol-generating device, the controller 110 may be configured to detect the user input and to generate a control signal for starting the configuration mode in response to detecting the user input. When the controller 110 is comprised within the charging device or a user device, controller 110 may be configured to detect or receive a control signal that launches the configuration mode of the aerosol-generating device.

Further, operation of the aerosol-generating device may require authentication based on user biometric information. Accordingly, if no biometric information was received before the end of the configuration mode, the controller 110 is configured to generate a control signal to at least one of lock the aerosol-generating device, cease operation of the aerosol-generating device, switch off the aerosol-generating device and prevent generation of an aerosol by the aerosol-generating device.

The components of control system 100 as described above in relation to FIG. 1 may be located within a single device, such as the aerosol-generating device. Alternatively, the components of control system 100 may be distributed across the aerosol-generating device, the charging device associated with the aerosol-generating device and the user device. In this respect, although FIG. 1 illustrates a single controller 110, any references to controller 110 are to be understood as meaning one or more controllers. For example, the aerosol-generating device may comprise at least one of the one or more biosensors 140A-C and at least one controller of the one or more controllers 110. The charging device may comprise the data store 150 and at least one controller of the one or more controllers 110. User device may comprise at least one biosensor of the one or more biosensors 140A-C and at least one of the one or more controllers 110.

Figure 2:
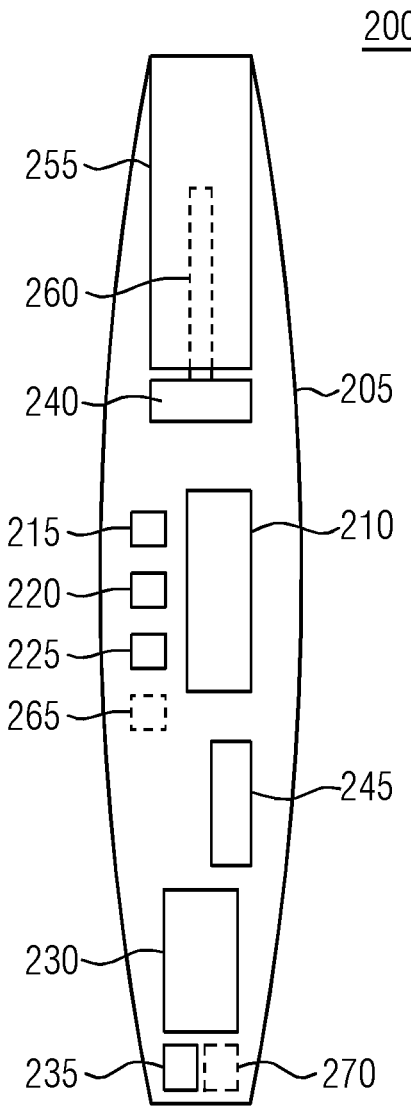
FIG. 2 shows an aerosol-generating device.

FIG. 2 illustrates the aerosol-generating device 200. The aerosol-generating device 200 comprises a body 205, a controller 210, at least one biosensor 215, at least one indicator 220, an operating button 225, a power supply 230, a power contact 235, a heater assembly 240, and a communication interface 245. The aerosol-generating device may additionally comprise a data contact interface 270. The aerosol-generating device 200 may additionally comprise a data store 265. Data store 265 may correspond to memory 120 or remote storage 150.

The aerosol-generating device 200 is configured to receive an aerosol-generating article. Preferably, the body 205 of the aerosol-generating device 200 comprises a cavity 255 for receiving the aerosol-generating article. The aerosol-generating article comprises an aerosol-forming substrate. The aerosol-forming substrate of the aerosol-generating article may be a solid, such as a tobacco stick. The aerosol-forming substrate of the aerosol-generating article may be a liquid. The heater assembly 240 is configured to heat a heating element 260. The heating element 260 is configured to, when activated, heat the aerosol forming substrate to form an aerosol. The heating element 260 may be a component of the aerosol-generating device 200 or comprised within the aerosol-generating article. The heating element 260 may be a blade or pin that uses a resistor for resistive heating. The heating element 155 may be a susceptor for induction heating.

The controller 210 is configured to generate control signals to control operation of the aerosol-generating device 200. The controller 210 may be one of the one or more controllers 110 described above with respect to FIG. 1.

The at least one indicator 220 may be any suitable indicator for providing user-perceptible feedback, such as status indications of the aerosol-generating device 200. For example, the at least one indicator 220 may be a visual indicator such as light-emitting diode. Additionally or alternatively, the at least one indicator 220 may be a haptic indicator.

The at least one biosensor 215 is integrated into the housing 205 of the aerosol-generating device 200 such that the at least one biosensor 215 obtains biometric information from the user when the user holds the aerosol-generating device 200. For example, a recessed surface (not shown) may be provided in the body 205 of the aerosol-generating device 200 to provide ergonomic contact with the at least one biosensor 215. The recessed surface may also provide some protection for the at least one biosensor 215. The at least one biosensor 220 may be one of the one or more biosensors 140A-C described above with respect to FIG. 1.

The operating button 225 is an actuator that enables user input for operating the aerosol-generating device 200. For example, the operating button 225 may allow the user to switch the aerosol-generating device on or off. The operating button 225 may enable the user to provide user input for starting one or more operating modes of the aerosol-generating device 200, such as the configuration mode. For example, a single press of the operating button 225 may switch the aerosol-generating device on or off. A pattern of presses of the operating button 225 may enable selection of an operating mode of the aerosol-generating device.

The communication interface 245 is configured to enable the aerosol-generating device 200 to wirelessly communicate with other devices, such as the charging device associated with the aerosol-generating device or a user device. In particular, where controller 110 is not located within the aerosol-generating device 110, controller 210 may communicate with controller 110 via the communication interface 245. The aerosol-generating device 200 may additionally or alternatively communicate with the charging device via the data contact 265.

The power supply 230 preferably comprises a power source such as a battery. The battery may be, for example, a lithium ion battery. As an alternative, the power source may be another form of charge storage device such as a capacitor. The power source may require recharging. For example, the power source may have sufficient capacity to allow for the continuous generation of aerosol for a period of around six minutes or for a period that is a multiple of six minutes. In another example, the power source may have sufficient capacity to allow for a predetermined number of puffs or discrete activations of the heater assembly.

The power supply 230 may comprise control electronics. The control electronics may comprise a microcontroller. The microcontroller is preferably a programmable microcontroller. The electric circuitry may comprise further electronic components. The electric circuitry may be configured to regulate a supply of power to the heater assembly 240. Power may be supplied to the heater assembly 240 continuously following activation of the system or may be supplied intermittently, such as on a puff-by-puff basis. The power may be supplied to the heater assembly 240 in the form of pulses of electrical current.

Figures 3A, 3B:
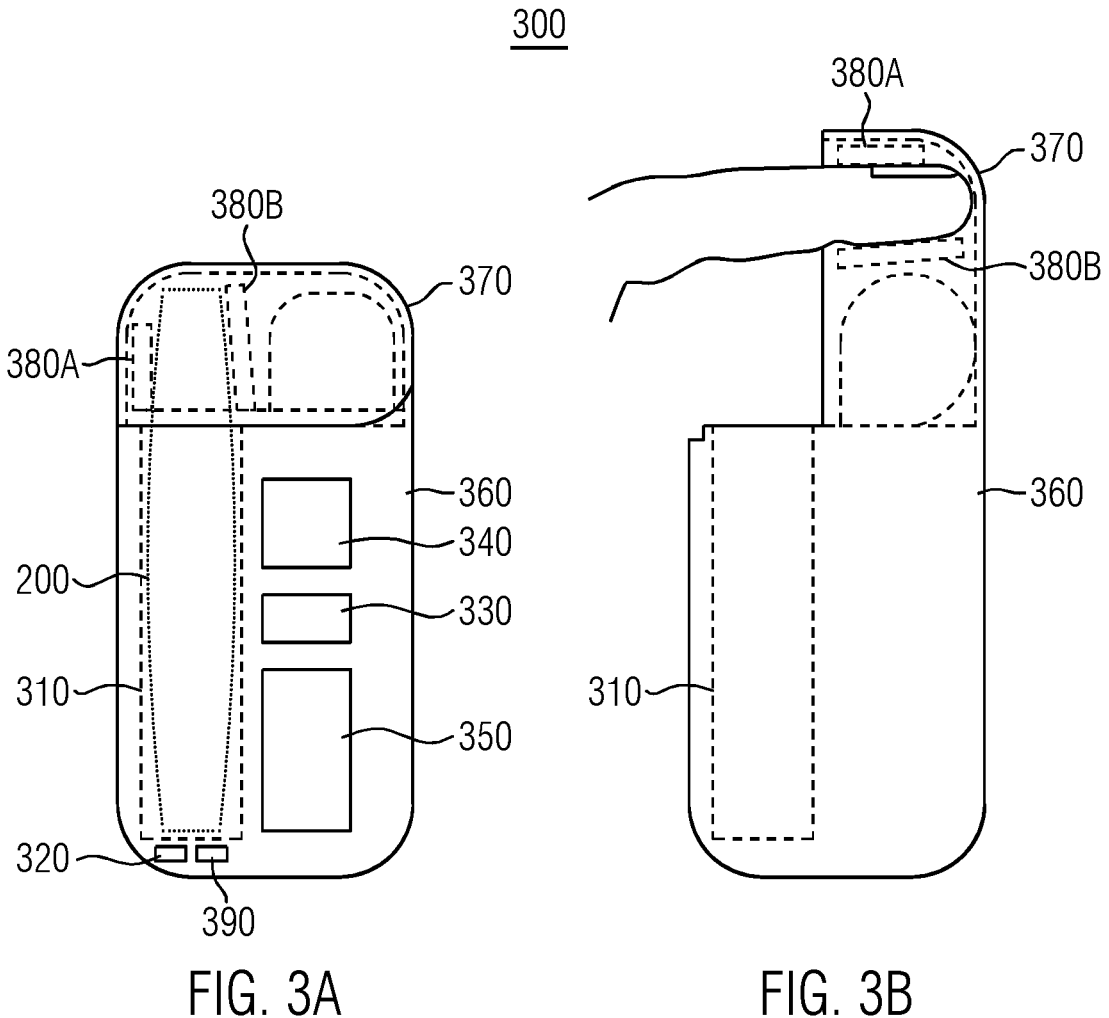
FIG. 3 shows a charging device associated with an aerosol-generating device.

The power source may be recharged using a charging device, such as the charging device 300 illustrated in FIGS. 3A and 3B. Power contact 235 may be an electrical contact pad configured to electrically couple the power supply 230 of the aerosol-generating device 200 to the charging device 300.

Turning to FIGS. 3A and 3B, the charging device 300 comprises a cavity 310 that is configured to receive an aerosol-generating device, such as aerosol-generating device 200, a cover 370 (for example, a lid) and a body 360. The cover 370 may be closed (FIG. 3A) or opened (FIG. 3B). The cover 370 opens at least up to an angle (for example, 90 degrees) that provides sufficient clearance for the insertion of the aerosol-generating device 200 into the cavity 310. The cover 370 may be closed to contain and protect aerosol-generating device 200 when charging. The charging device 300 further comprises a communication interface 330, a controller 340, a power supply 350, a power contact 320 and a data contact 390.

The power contact 390 may be located within the cavity 310. The power contact 380 is configured to contact with a corresponding power contact 235 of the aerosol-generating device 200. Specifically, when the aerosol-generating device 200 is received within the cavity 310, the power contact 380 contacts with the power contact 235 so that the charging device 300 can charge the rechargeable power source of the aerosol-generating device 200. The power supply 350 of the charging device 300 may be a battery. The power supply 350 of the charging device 300 may be circuitry that can be connected to a mains electricity supply.

In addition, the charging device 300 and the aerosol-generating device 300 may be configured to exchange data with each other. Data may include control signals. For example, the charging device 200 and the aerosol-generating device 300 may be configured to exchange data with each other wirelessly. For example, the charging device 300 comprises a communication interface 330 for wirelessly communicating with other devices such as the aerosol-generating device and a user device. Accordingly, the aerosol-generating device 200 and the charging device 300 may exchange data via their respective communication modules 210 and 330. Additionally or alternatively, the charging device 300 may comprise a data contact interface 390 for communicating with the aerosol-generating device 200. When the aerosol-generating device 200 is received within the cavity 310, the data contact interface 390 contacts with the data contact interface 270 of the aerosol-generating device 200 and data may be exchanged.

Charging device 300 comprises a controller 340 that is configured to generate control signals to control operation of the charging device 300. The charging device 300 may be one of the one or more controllers 110 described above with respect to FIG. 1.

The charging device 300 may comprise at least one biosensor 380 of the one or more biosensors 140A-C. The at least one biosensor 380 may be integrated into the body 360 or cover 370 of the charging device so that the at least one biosensor 215 obtains biometric information from the user when the user holds the charging device 200. Additionally or alternatively, as illustrated in FIGS. 3A and 3B, at least one biosensor 380 may be integrated into the cover 370 so that, when the cover 370 is opened, the user may access the at least one biosensor 380. In particular, the user may insert a finger into a recess formed by biosensors 380A and 380B.

Figure 4:
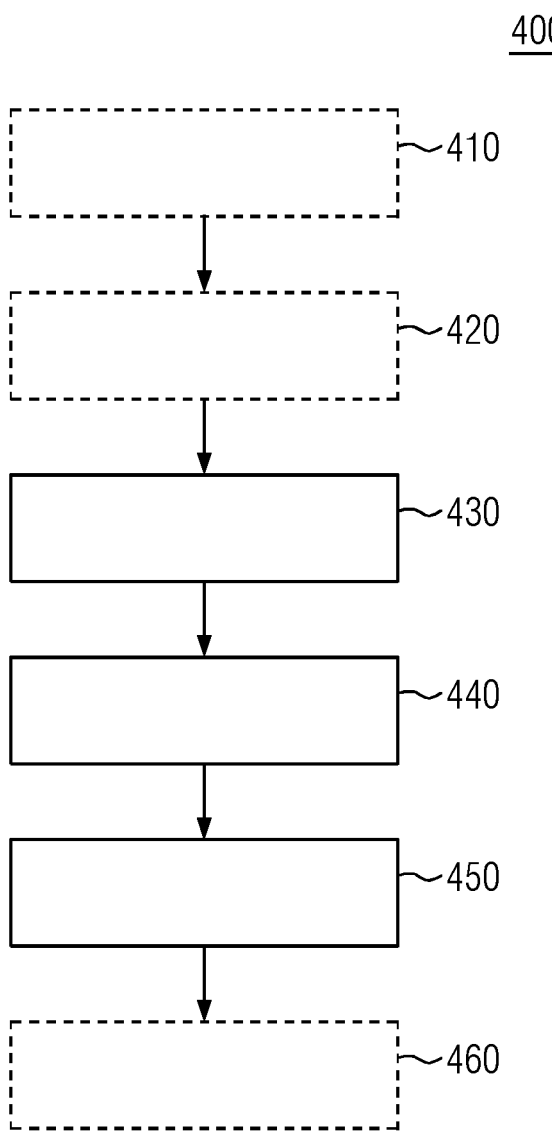
FIG. 4 shows a flow diagram of a method for controlling an aerosol-generating device.

FIG. 4 is a flow diagram illustrating a method for controlling operation of an aerosol-generating device 200. The steps of the method may be performed by one or more controllers 110 as described above with respect to FIGS. 1, 2 and 3. The method begins at optional step 410 where user input to switch on or activate the aerosol-generating device 200 is received. As described above, the user input may comprise user actuation of an operating button 225 of the aerosol-generating device 200. In response to receiving the user input, at optional step 420, a control signal to start a configuration mode of the aerosol-generating device 200 is generated. During the configuration mode, the aerosol-generating device 200 is configured for operation by the user. As described above, the configuration mode may be a pre-heating mode. At step 430, biometric information of the user is obtained from one or more biosensors 140A-C. Although step 430 is illustrated as being performed after steps 410 and 420, it is to be understood that step 430 may be performed before or concurrently with steps 410 and 430. Based on the biometric information, a determination is made as to whether the user is authenticated (step 440). Determining whether the user is authenticated may comprise analyzing the biometric information received from the one or more biosensors 140A-C to determine whether the age of the user is above an age threshold. Additionally or alternatively, determining whether the user is authenticated may comprise analyzing the biometric information to determine an identity of the user. For example, the biometric information may be analyzed to determine that the user is a pre-registered user of the aerosol-generating device 200. At step 450, a control signal for controlling operation of the aerosol-generating device is generated based on the determination at step 440.

As described above, the control signal enables or prevents operation of the aerosol-generating device based on whether the user is authenticated or not. If the control signal enables operation of the aerosol-generating device 200, a control signal is generated to end the configuration mode (step 260) and the aerosol-generating device may be used by a user to generate an aerosol.

Some or all of the method steps described above with regard to FIG. 4 may be implemented by a computer in that they are executed by (or using) a processor, a microprocessor, an electronic circuit or processing circuitry. For example, the implementation can be performed using a non-transitory storage medium such as a computer-readable storage medium. Such computer-readable media can be any available media that can be accessed by a general-purpose or special-purpose computer system.

Generally, the method can be implemented as a computer program product with a program code or computer-executable instructions, the program code or computer-executable instructions being operative for performing one of the methods when the computer program product runs on a computer. The program code or the computer-executable instructions may, for example, be stored on a computer-readable storage medium.

A storage medium (or a data carrier, or a computer-readable medium) may comprise, stored thereon, the computer program or the computer-executable instructions for performing one of the methods described herein when it is performed by a processor. An apparatus may comprise one or more processors and the storage medium mentioned above.

An apparatus may comprise means, for example processing circuitry like e.g. a processor communicating with a memory, the means being configured to, or adapted to, perform one of the methods described herein.

A computer may have installed thereon the computer program or instructions for performing one of the methods described herein.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein. Within this context, a number A may be considered to include numerical values that are within general standard error for the measurement of the property that the number A modifies. The number A, in some instances as used in the appended claims, may deviate by the percentages enumerated above provided that the amount by which A deviates does not materially affect the basic and novel characteristic(s) of the claimed invention. Also, all ranges include the maximum and minimum points disclosed and include any intermediate ranges therein, which may or may not be specifically enumerated herein.

The invention claimed is:

1. A system associated with an aerosol-generating device, the system comprising:
    one or more biosensors configured to obtain biometric information of a user having an age; and
    one or more controllers configured to:
        analyze the biometric information obtained by the one or more biosensors to determine whether the age of the user is above or below an age threshold, and
        generate a control signal for controlling operation of the aerosol-generating device based on whether the age of the user is determined to be above or below the age threshold.

2. The system according to claim 1,
    wherein analyzing the biometric information obtained by the one or more biosensors to determine whether the age of the user is above or below the age threshold comprises comparing the biometric information obtained by the one or more biosensors to one or more sets of reference biometric information, and
    wherein the one or more sets of reference biometric information correspond to age-dependent groups of users.

3. The system according to claim 1, wherein the one or more controllers are further configured to analyze the biometric information during a configuration mode of the aerosol-generating device.

4. The system according to claim 3, wherein the one or more controllers are further configured to generate the control signal for controlling operation of the aerosol-generating device before an end of the configuration mode.

5. The system according to claim 3, wherein the configuration mode is a pre-heating mode of the aerosol-generating device.

6. The system according to claim 1, wherein the controller is further configured to, in response to generating the control signal for controlling operation of the aerosol-generating device, generate an alert.

7. The system according to claim 1,
    further comprising the aerosol-generating device,
    wherein the aerosol-generating device comprises at least one of the one or more biosensors, a data store configured to store one or more sets of reference biometric information, and at least one of the one or more controllers.

8. The system according to claim 1,
    further comprising the aerosol-generating device and a charging device associated with the aerosol-generating device,
    wherein the aerosol-generating device comprises at least one of the one or more biosensors, and
    wherein the charging device comprises a data store configured to store one or more sets of reference biometric information and at least one controller of the one or more controllers.

9. A method for controlling operation of an aerosol-generating device, the method comprising:
    obtaining, from one or more biosensors, biometric information of a user having an age;
    analyzing the biometric information obtained by the one or more biosensors to determine whether the age of the user is above or below an age threshold; and
    generating a control signal for controlling operation of the aerosol-generating device based on whether the age of the user is determined to be above or below the age threshold.

10. The method according to claim 9, further comprising analyzing the biometric information obtained by the one or more biosensors to identify the user.

11. The method according to claim 9,
    further comprising, in response to detecting a user input, generating a control signal for starting a configuration mode of the aerosol-generating device,
    wherein the configuration mode of the aerosol-generating device is a pre-heating mode of the aerosol-generating device.

12. The method according to claim 11,
    wherein the control signal for controlling operation of the aerosol-generating device is generated before the end of the configuration mode, and/or
    the method further comprising generating a control signal for locking the aerosol-generating device if no biometric information is obtained from the one or more biosensors before an end of the configuration mode.

13. The method according to claim 9, wherein generating a control signal for controlling operation of the aerosol-generating device comprises one of:
    generating a control signal that prevents usage of the device,
    generating a control signal for locking the aerosol-generating device,
    generating a control signal for unlocking the aerosol-generating device,
    generating a control signal for switching off the aerosol-generating device,
    generating a control signal for ceasing operation of the aerosol-generating device,
    generating a control signal for allowing the aerosol-generating device to generate an aerosol, and
    generating a control signal for preventing the aerosol-generating device from generating an aerosol.

14. The method according to claim 9, wherein the biometric information includes at least one of a heart rate value, a heart rate signal, an arterial stiffness value, a blood pressure value, and motion information.

15. A nontransitory computer-readable storage medium having computer-executable instructions stored thereon, which, when executed by a processor, perform the method according to claim 9.

* * * * *